United States Patent [19]

Malen

[11] Patent Number: 4,572,571
[45] Date of Patent: Feb. 25, 1986

[54] VEHICLE BODY FLOOR PAN ASSEMBLY

[75] Inventor: Donald E. Malen, Lathrup Village, Mich.

[73] Assignee: General Motors Corporation, Detroit, Mich.

[21] Appl. No.: 619,629

[22] Filed: Jun. 11, 1984

[51] Int. Cl.⁴ ............................................. B62D 25/20
[52] U.S. Cl. .................................. 296/197; 296/204; 296/1 F
[58] Field of Search ............... 296/1 F, 204, 187, 193, 296/197, 203

[56] References Cited

U.S. PATENT DOCUMENTS 3,940,176  2/1976  Ito et al. ........................ 296/204 X
4,402,545  9/1983  Utsunomiya ....................... 296/204

*Primary Examiner*—Robert B. Reeves
*Assistant Examiner*—Russell D. Stormer
*Attorney, Agent, or Firm*—Herbert Furman

[57] ABSTRACT

A vehicle body floor pan assembly includes a pair of longitudinally extending floor pan units comprised of longitudinally arranged vertical load reacting non-axisymmetric membrane panels which are longitudinally connected by a central tunnel member having a catenary shape upper wall which reacts to the vertical loads applied to the membrane panels.

3 Claims, 3 Drawing Figures

VEHICLE BODY FLOOR PAN ASSEMBLY

This invention relates generally to vehicle body floor pan assemblies and more particularly to a vehicle body floor pan assembly having nonaxisymmetric membrane panels for reacting to vertical loads and catenary shape members for supporting the membrane panels in the vertical direction.

Vehicle body floor pan assemblies are generally comprised of stampings providing right hand and left hand floor pan units connected by a central tunnel member. The floor pan sections and the panel member have various ribs and indentations for both reinforcement or strength purposes and anti-noise purposes.

The floor pan assembly of this invention is of this general type in that it includes a pair of longitudinally extending floor pan units, each comprised of a longitudinally arranged pair of floor pan sections, which are connected by a central tunnel member which extends longitudinally of the floor pan assembly. The assembly differs from the prior art in that the floor pan sections are generally non-axisymmetric membrane panels of shallow dish shape which accept and react only to vertical loads. Such panels need not have any surface indentations, such as ribs or otherwise, for reinforcement or strength purposes or for anti-noise purposes. The central tunnel member is a catenary structure and has a catenary shape upper wall, and side walls which join the upper wall to the inner longitudinal edges of the floor pan units. The central tunnel member accepts vertical loads from the floor pan sections and reacts these loads with loads contained in the upper catenary shape wall thereof and extending longitudinally thereof and of the floor pan assembly. Such loads are tangent to the ends of the upper wall of the central tunnel member. Additionally, the floor pan assembly, if desired, can be provided with a transverse tunnel member provided by transversely extending reinforcement tunnel members which extend laterally to the central tunnel member. Each reinforcement tunnel member has an upper wall of catenary shape and side walls which are secured to a respective right hand or left hand floor pan unit. These reinforcement tunnel members cooperatively define a catenary structure which accepts vertical loads from the floor pan sections and reacts these loads with loads contained therein and extending longitudinally thereof and laterally of the floor pan assembly. Such loads are tangent to the ends of the upper walls. The catenary structures react to vertical loads with loads tangent to the catenary. Such structures are similar to a string or cable held at its ends and loaded vertically by its weight. When the catenary structure is loaded with vertical loads, the loads in the structure are uniform and tangent and no bending stresses are generated. For this reason the catenary structures of the floor pan assembly of this invention provide economy of material not available with known floor pan assemblies.

The primary object of this invention is to provide an improved vehicle body floor pan assembly which includes a pair of longitudinally extending floor pan units comprised of nonaxisymmetric membrane panels for reacting to vertical loads and a tunnel member which connects the floor pan units and has an upper wall of catenary shape for reacting the vertical loads with longitudinal loads contained therein.

These and other objects of the invention will be readily apparent from the following specification and drawings wherein.

Figure 1:
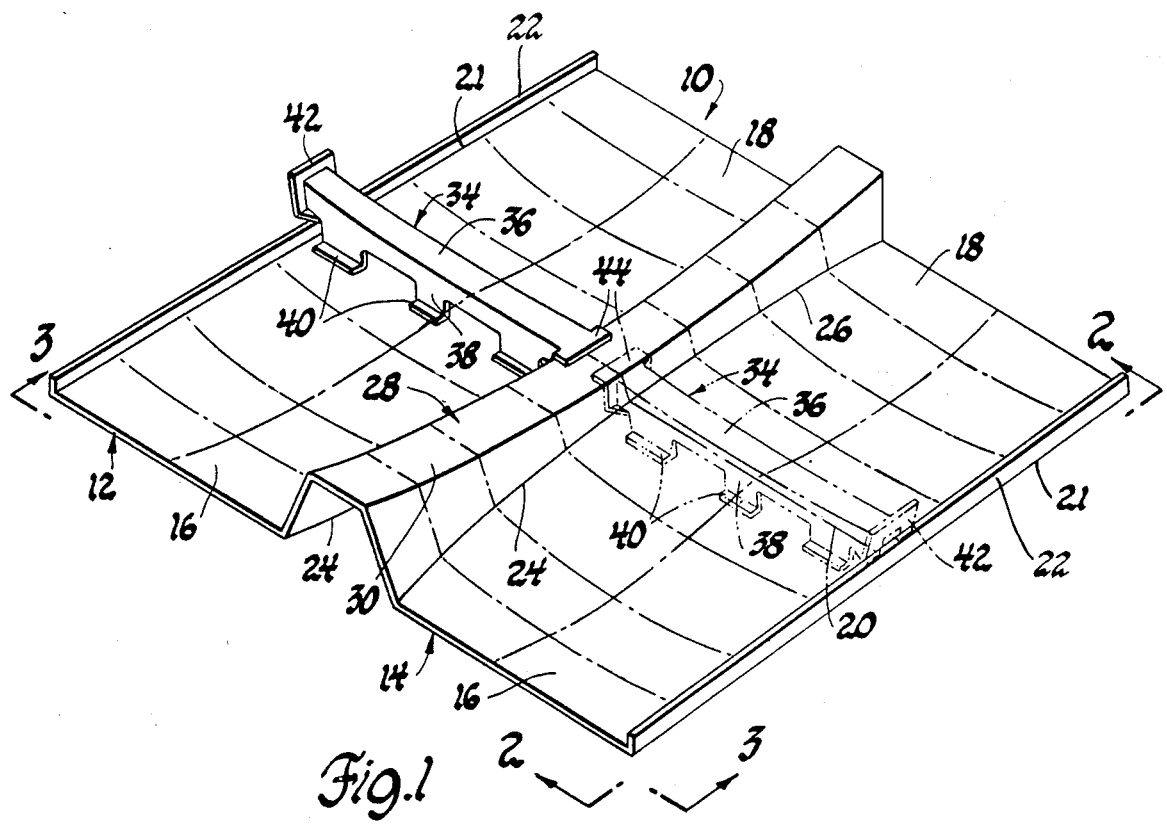
FIG. 1 is a perspective view of a vehicle floor pan assembly according to this invention.
Figure 2:
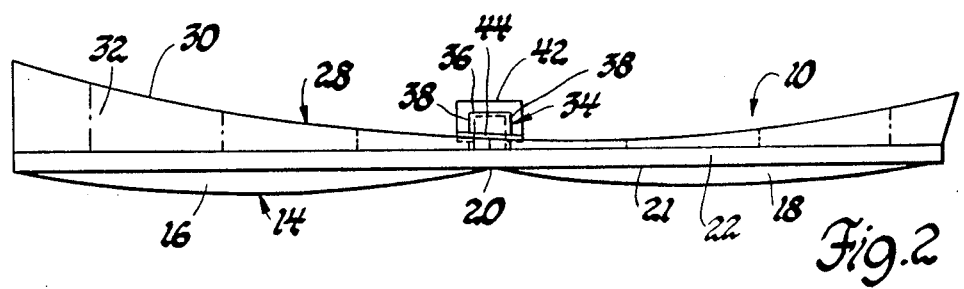
FIG. 2 is a partially broken away elevational view taken generally along the plane indicated by line 2—2 of FIG. 1.
Figure 3:
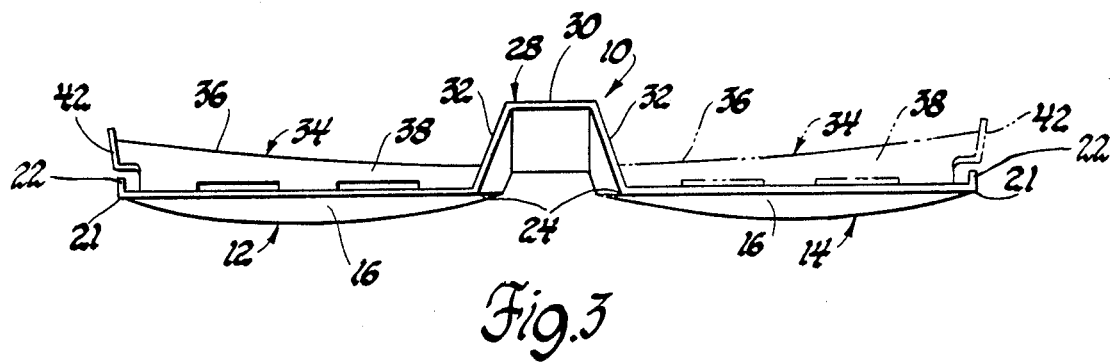
FIG. 3 is a partially broken away elevational view taken along line 3—3 of FIG. 1.

Referring now particularly to FIG. 1 of the drawings, a vehicle body floor pan assembly 10 according to this invention includes a pair of longitudinally extending floor pan units 12 and 14. Each floor pan unit includes a front floor pan section 16 and a rear floor pan section 18 which are integrally joined or secured to each other at their adjoining forward and rearward edge portions by a transverse juncture rib 20. The outer longitudinal edge portions 21 of the floor pan sections 16 and 18 are provided with a vertical flange 22 which provides for a connection of the sides of the floor pan assembly to right hand and left hand rocker panel structures. The inner longitudinal edge 24 of the front floor pan sections 16 is of arcuate shape as is the inner longitudinal edge 26 of the rear floor pan sections 18. The edges 24 and 26 are axisymmetric of each other. As is apparent from FIGS. 1 through 3, the floor pan sections 16 and 18 are membrane panels of shallow dish shape. The manner in which these panels are formed is disclosed and claimed in co-pending application Ser. No. 619,624 filed June 11, 1984, in the name of this inventor, and assigned to the same assignee.

The floor pan units 12 and 14 are interconnected by a tunnel member 28 having a catenary shape upper wall 30 and side walls 32 which integrally connect the upper wall 30 to the inner longitudinal edges 24 and 26 of the floor pan sections 16 and 18. Although the edges 24 and 26 are shown integral with walls 32, the tunnel member 28 can be formed separately and secured to the inner longitudinal edges 24 and 26 in a conventional manner such as by flanges on either the sections 16 and 18 or the walls 32.

The assembly 10 further includes transverse reinforcement tunnel members 34 for reinforcement and seat support purposes. Only one member 34 is shown in full lines for clarity. Each member 34 includes an upper catenary shape wall 36 and cut away side walls 38 which are joined to respective units 12 and 14 by flanges 40. The right hand tunnel member 34 and the like asymmetrical left hand member cooperatively provide a transverse tunnel member having a catenary shape upper wall. The outer free end of each member 34 is provided with a peripheral flange 42 for attachment to a rocker panel structure, and the inner end of each member 34 includes a flange 44 for securement to wall 30 of member 28.

The membrane panels 16 and 18 accept only vertical loads and it will be noted that these panels do not have any reinforcement ribs or surface indentations for reinforcement purposes or for noise purposes since such ribs or indentations are totally unnecessary for such purposes. The central tunnel member 28 accepts vertical loads from the floor pan sections and reacts these loads with loads contained in the upper catenary shape wall thereof and extending longitudinally thereof and of the floor pan assembly. Such loads are tangent to the ends of the upper wall of the central tunnel member and the transverse tunnel member cooperatively defined by the members 34 also has a catenary shape upper wall which accepts vertical loads from the floor pan units 12 and 14. This upper wall reacts to these vertical loads with loads contained therein and extending longitudinally thereof and transversely of the floor pan assembly.

Thus this invention provides a vehicle body floor pan assembly.

The embodiments of the invention in which an exclusive property or privilege is claimed are defined as follows:

1. A vehicle body floor pan assembly comprising, in combination, a pair of longitudinally extending floor pan units, each unit including a longitudinally arranged pair of floor pan sections, each section including longitudinal inner and outer edge portions and transverse forward and rearward edge portions joining the longitudinal edge portions, each floor pan section being a vertical load reacting nonaxisymmetric membrane panel of shallow dish shape which accepts only vertical loads and is substantially free of surface indentations, means securing the sections of each unit to each other at transverse adjoining forward and rearward edge portions thereof, a longitudinal extending central tunnel member joining the longitudinal inner edge portions of the sections, the central tunnel member including a catenary shape upper wall and side walls joining the upper wall to the inner longitudinal edge portions of each of the floor pan sections of the floor pan unit, the catenary shape upper wall of the central tunnel member accepting vertical loads from the membrane panels of the floor pan sections and reacting to such vertical loads with loads extending longitudinally of such upper wall.

2. A vehicle body floor pan assembly comprising, in combination, a pair of longitudinally extending floor pan units, each unit including a longitudinally arranged pair of floor pan sections, each section including longitudinal inner and outer edge portions and transverse forward and rearward edge portions joining the longitudinal edge portions, each floor pan section being a vertical load reacting nonaxisymmetric membrane panel of shallow dish shape which accepts only vertical loads and is substantially free of surface indentations, the sections of each unit being integrally secured by a juncture rib to each other at the forward and rearward edge portions thereof, a longitudinal extending central tunnel member joining the longitudinal inner edge portions of the sections, the central tunnel member including a catenary shape upper wall and side walls joining the upper wall to the inner longitudinal edge portions of each of the floor pan sections of the floor pan unit, the upper wall of the central tunnel member accepting vertical loads from the membrane panels of the floor pan sections and reacting to such vertical loads with loads extending longitudinally of such upper wall.

3. A vehicle body floor pan assembly comprising, in combination, a pair of longitudinally extending floor pan units, each unit including a longitudinally arranged pair of floor pan sections, each section including longitudinal inner and outer edge portions and transverse forward and rearward edge portions joining the longitudinal edge portions, each floor pan section being a vertical load reacting nonaxisymmetric membrane panel of shallow dish shape which accepts only vertical loads and is substantially free of surface indentations, means securing the sections of each unit to each other at transverse adjoining forward and rearward edge portions thereof, a longitudinal extending central tunnel member joining the longitudinal inner edge portions of the sections, the central tunnel member including a load reacting catenary shape upper wall and side walls joining the upper wall to the inner longitudinal edge portions of the floor pan sections of the floor pan unit, and a reinforcement tunnel member having a catenary shape upper wall and side walls secured to each floor pan unit, the reinforcement tunnel members extending transverse of the central tunnel member in aligned relationship and cooperatively defining a transverse tunnel member having a catenary shape upper wall.

* * * * *